United States Patent Office 3,331,457
Patented July 18, 1967

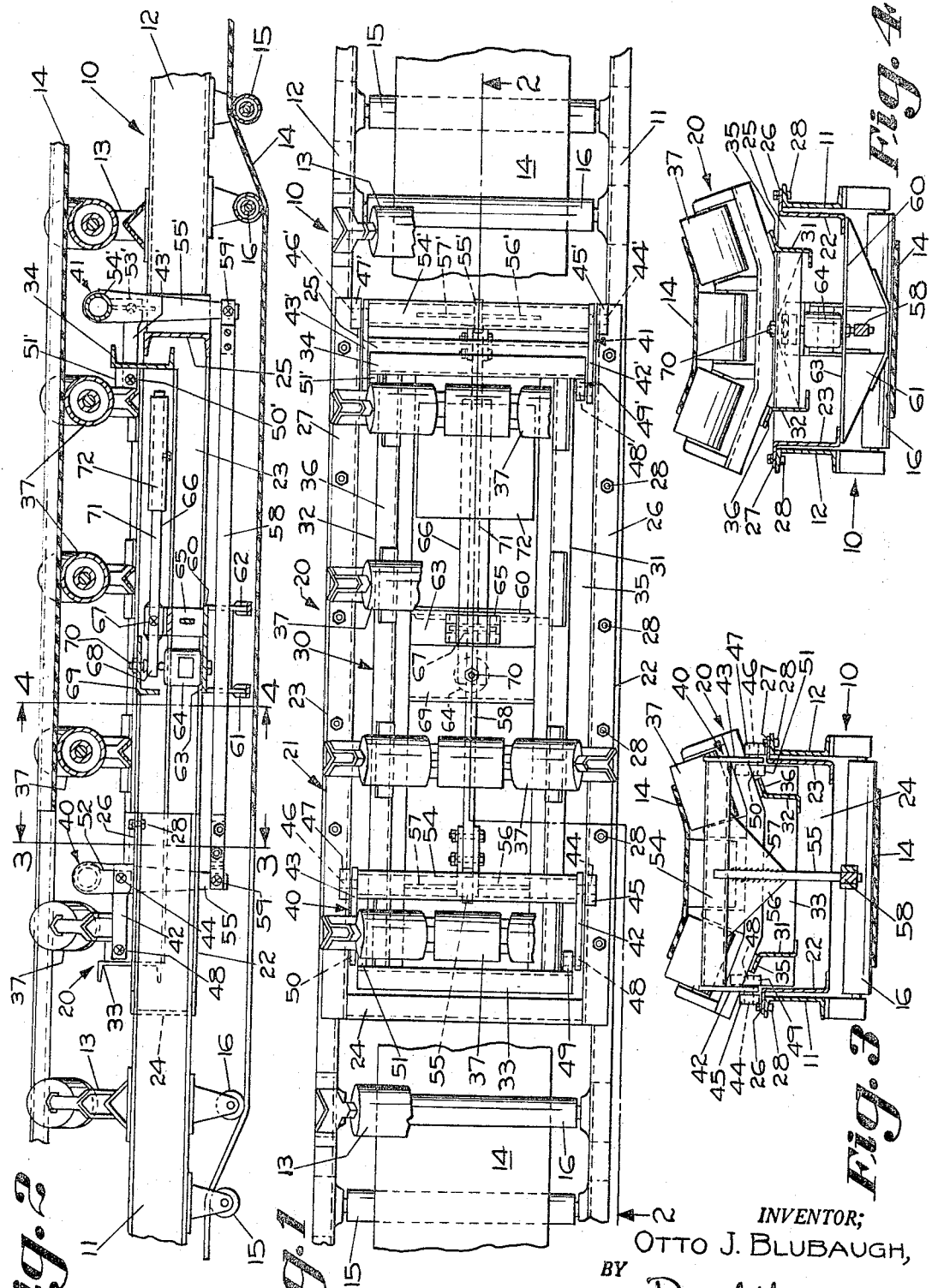

3,331,457
BELT CONVEYOR WEIGHING APPARATUS
Otto J. Blubaugh, Westerville, Ohio, assignor to Jeffrey Galion Manufacturing Company, a corporation of Ohio
Filed Apr. 9, 1965, Ser. No. 447,037
6 Claims. (Cl. 177—16)

The instant invention relates to belt conveyors, and more particularly to weighing apparatus for weighing the load of material carried by the conveyor belt.

It is an object of the instant invention to provide an improved belt conveyor weighing apparatus, which is of simple construction and is reliable in its operation, to accurately weigh the load of material on the conveyor belt.

It is another object of the instant invention to provide a belt conveyor weighing apparatus of simple and rugged construction for dependable operation of the weighing apparatus during the service life thereof.

It is a further object of the instant invention to provide an improved belt conveyor weighing apparatus, in which the load of material is accurately weighed, notwithstanding any uneven loading of the material on the belt.

It is still another object of the instant invention to provide an improved belt conveyor weighing apparatus, in which the force of the load of material is transmitted by a movable frame to a load cell, and there being a counterweight for the frame and its elements, so that substantially the full range of the load cell may be utilized for weighing the material.

It is also an object of the instant invention to provide an improved belt conveyor weighing apparatus comprising a weighing frame which is movable in response to the load of material on the conveyor belt, and including means for stabilizing the frame for level movement of the frame in response to the force of the load of material, so that the weighing apparatus will accurately weigh the load of material.

Other objects of the invention will appear hereinafter, the novel features and combinations being set forth in the appended claims.

In the drawings:

FIG. 1 is a plan view of a belt conveyor, including the weighing apparatus of this invention;

FIG. 2 is an elevational view, partially in section on the line 2—2 in FIG. 1;

FIG. 3 is a sectional view on the line 3—3 in FIG. 2; and

FIG. 4 is a sectional view on the line 4—4 in FIG. 2.

Referring to the drawings, there is illustrated therein a belt conveyor 10 comprising side rails 11, 12, which are laterally spaced from the frame of the conveyor 10. A plurality of troughing idlers 13, 13 are secured to the tops of the side rails 11, 12 at spaced positions along the conveyor 10. The troughing idlers 13, 13 are in supporting engagement with the conveying run of an endless conveyor belt 14, which moves on the rolls of the troughing idlers 13. The conveyor belt 14 is formed with a troughed section to retain the material on the belt 14.

A plurality of return idlers 15, 15 are secured to the bottoms of the side rails 11, 12, to be in supporting engagement with the return run of the endless conveyor belt 14. There are also provided two return idlers 16, 16, which are disposed one adjacent each of the return idlers 15, 15, as seen in FIG. 2. The return run of the conveyor belt 14 moves over the return idlers 15, 15 and under the two return idlers 16, 16, thereby providing vertical clearance for the weighing apparatus 20.

The weighing apparatus 20 has a rectangular base 21, formed of laterally spaced side members 22, 23 and end members 24, 25, which extend laterally between the side members 22, 23, with the several members being rigidly joined to form a sturdy box-like structure. The side members 22, 23 extend somewhat beyond the end member 25. The side members 22, 23 have flanges 26, 27, respectively, which extend laterally outwardly, and are disposed over the side rails 11, 12 to support the base 21 on the conveyor 10. The base 21 is secured to the side rails 11, 12 by a plurality of bolts 28, to maintain the base 21 in fixed position in the conveyor 10.

Within the base 21, there is a rectangular weighing frame 30, that is formed of side members 31, 32 and end members 33, 34. The side members 31, 32 are laterally spaced, and the end members 33, 34 are secured to the ends of the side members 31, 32, to form the frame 20 as a rigid box-like element that fits within the base 21, and is substantially coextensive therewith.

The side members 31, 32 have flanges 35, 36, respectively, which incline upwardly and outwardly to provide supports for a plurality of troughing idlers 37, which are secured thereto. In the illustrated embodiment, there are four troughing idlers 37 on the weighing frame 30. However, a greater or lesser number may be installed, in accordance with the requirements of a given application of the weighing apparatus 20. The troughing idlers 37 are the same size as the troughing idlers 13, and are set in line with the latter, so as not to interrupt the conveying run of the conveyor belt 14 as it travels over the weighing apparatus 20.

At one end of the base 21 and the frame 30, there is a first linkage 40, and at the opposite end of the base 21 and the frame 30, there is a second linkage 41. The first and second linkages 40, 41 are alike in construction, and are similarly disposed, and accordingly, only the first linkage 40 will be described in detail. In the second linkage 41, the like parts bear the same reference numerals as in the first linkage 40, with the addition of a prime (') to each numeral. It will be noted in the following description that the first linkage 40 is connected to the base 21 inside the end member 24, whereas the second linkage 41 is connected to the base 21 outside the end member 25, on the extensions of the side members 22, 23.

In the first linkage 40, there are two lateral links 42, 43, which are disposed at the opposite sides of the base 21 and of the frame 30, and between the latter. The lateral link 42 is connected to the base 21 by a flexural pivot 44, which is secured in the link 42 and in a mounting block 45, as best seen in FIG. 1, the latter being secured to the flange 26 of the side member 22. The lateral link 43 is similarly connected to the base 21 by a flexural pivot 46, that is secured to the lateral link 43 and to a mounting block 47, as best seen in FIG. 1, the latter being secured on the flange 27 of the side member 23.

The lateral link 42 is connected to the weighing frame 30 by a flexural pivot 48, which is secured to the end of the link 42, and to a mounting block 49, as best seen in FIG. 1, the latter being secured to the end member 33 outside the side member 31. The link 43 is similarly connected to the weighing frame 30 by a flexural pivot 50 that is secured to the link 43 and to a mounting block 51, as best seen in FIG. 1, and the latter is secured to the end member 33 outside the side member 32.

The lateral link 42 has an upright leg 52, which extends upwardly from the flexural pivot 44. The lateral link 43 similarly has an upright leg 53, which extends upwardly from the flexural pivot 46. A first tubular crossmember 54 is disposed between the upright legs 52, 53 in a transverse position, and is fixedly secured to the upright legs 52, 53. Thus the tubular cross-member 54 joins the lateral links 42, 43, for joint movement of the latter, as best seen in FIG. 3.

The weighing frame 30 is movable relatively to the base 21. Such movement of the weighing frame 30 is constrained by the lateral links 42, 43, and since the latter move jointly, the movement of the one end of the weighing frame 30 is maintained level. The lateral links 42′, 43′ of the second linkage 41 operate in the same manner to constrain the other end of the weighing frame 30 to level movement. The flexural pivots 44, 46, 48, 50, by which the lateral links 42, 43 are connected to the base 21 and to the weighing frame 30, provide frictionless pivotal connections. In such flexural pivots, there are springs that are flexed by the relative movement of the parts, and there is no contact of any moving parts, thereby eliminating friction and wearing of the elements, both of which would affect the reliability of the weighing apparatus, particularly over a period of time. Such flexural pivots are described in the patent to Henry Troeger, Pat. No. 3,181,851, May 4, 1965, for Flexural Pivot.

An upright lever 55 is secured to the tubular cross-member 54 in depending position as best seen in FIG. 3. Gusset plates 56, 57 are secured to the cross-member 54 and to opposite sides of the lever 55, to rigidify these elements. The upright lever 55 extends down below the base 21. A stabilizing link 58 is pivotally connected to the lower end of the upright lever 55 by a flexural pivot 59, as best seen in FIG. 2. The stabilizing link 58 is similarly connected to the upright lever 55′ by a flexural pivot 59′. The stabilizing link 58 connects the first linkage 40 and the second linkage 41 through the respective upright levers 55, 55′, for joint movement of the first and second linkages 40, 41. Thus, the movement of the weighing frame 30 relatively to the base 21 is constrained to level movement. The flexural pivots 59, 59′ provide frictionless pivot connections of the stabilizing link 58 to the first and second linkages 40, 41.

A beam 60 extends across the base 21. The underside of the beam 60 has reinforcing webs 61, 62, in which there are provided aligned openings to permit the stabilizing link 58 to extend through, under the beam 60. The beam 60 provides a supporting platform 63 for a load cell 64, that is fixedly secured to the beam 60.

A post 65 is fixedly secured to the beam 60, in upright position adjacent to the load cell 64. A counterweight beam 66 is mounted on the upper end of the post 65, and is connected to the latter by a flexural pivot 67. The short end 68 of the beam 66 extends over the load cell 64. The weighing frame 30 has a cross-member 69 which extends over the load cell 64 and the short end 68 of the counterweight beam 66. An adjusting screw 70 is secured to the cross-member 69, and engages the short end 68 of the counterweight beam 66.

The long end 71 of the counterweight beam 66 extends to the opposite side of the flexural pivot 67 and the upright post 65. A counterweight 72 is slidably mounted on the long end 71 of the counterweight beam 66. Thus, the counterweight beam 66 and the counterweight 72 apply a counterbalancing force to the weighing frame 30, to counterbalance the tare weight of the latter and the troughing idlers 37. The extent to which the tare weight of the weighing frame 30 is counterbalanced is determined by the positioning of the counterweight 72 on the long end 71 of the counterweight beam 66. It is preferred that approximately ninety-five percent (95%) of the tare weight of the weighing frame 30 be counterbalanced, with the remaining part of the tare weight being utilized for bearing engagement of the adjusting screw 70 on the short end 68 of the beam 66, and on the load cell 64. Thus, the static load on the load cell 64 is relatively small, and substantially the entire range of the load cell 64 may be utilized for weighing the load of material on the belt.

In the operation of the weighing apparatus, the force of the load of material carried by the conveyor belt 14 is applied in a downward direction to the weighing frame 30, thereby producing movement of the weighing frame 30 relative to the base 21, the latter being fixedly secured to the conveyor side rails 11, 12. The force on the weighing frame 30, due to the load of material, flexes the flexural pivots for movement of the weighing frame 30. The load cell 64 is yieldable under the weighing frame 30 and the force that is applied to the load cell 64 produces a variation of the resistance of the load cell 64 that is proportional to the magnitude of the force and the load. The load cell 64 is connected in a circuit, as an element thereof, and the circuit is operated to produce a signal in accordance with the load cell 64, and which is related to the force on the load cell, and such signal may be calibrated in terms of weight of material on the conveyor belt 14, to give a direct reading of the weight.

In the weighing apparatus, constructed in accordance with this invention, the weighing frame 30 has a level movement under load, irrespective of any uneven loading of material on the conveyor belt 14. Thus, the apparatus is operative for producing an accurate and reliable reading of the weight of material carried by the conveyor belt 14. The construction of the weighing apparatus is of a simple form and is not subject to wear, and accordingly, it will produce reliable readings of weight during long periods of service.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a belt conveyor in which a belt is supported by idlers for travel of said belt on the idlers and to carry material on the belt, weighing apparatus to weight material that is carried on said belt comprising, a base to support said weighing apparatus in the conveyor, a weighing frame, a plurality of idlers secured to said weighing frame at spaced positions in supporting engagement with said belt for travel of the belt on the idlers, a first linkage between said base and said weighing frame, a second linkage between said base and said weighing frame, said first linkage and said second linkage being disposed at spaced positions along said base and said weighing frame, said first linkage including a first laterally disposed link, a first upright lever fixedly connected to said first laterally disposed link, said second linkage including a second laterally disposed link, a second upright lever fixedly connected to said second laterally disposed link, means connecting said first laterally disposed link and said second laterally disposed link to said base and to said weighing frame for movement of said frame relative to said base in response to the load of material on the conveyor belt, a stabilizing link between said first linkage and said second linkage, means connecting said stabilizing link to said first upright lever and to said second upright lever to constrain said first linkage and said second linkage to joint movement and for level movement of said weighing frame relative to said base, a load responsive device that is yieldable in direct proportion to the magnitude of said load, and said load responsive device being disposed between said weighing frame and said base for transmission of the force of said load to the load responsive device.

2. In a belt conveyor in which a belt is supported by idlers for travel of said belt on the idlers and to carry material on the belt, weighing apparatus to weigh material that is carried on said belt comprising, a base to support said weighing apparatus in the conveyor, a weighing frame, a plurality of idlers secured to said weighing frame at spaced positions in supporting engagement with said belt for travel of the belt on the idlers, a first linkage between said base and said weighing frame, a second linkage between said base and said weighing frame, said first linkage and said second linkage being disposed at spaced positions along said base and said weighing frame, said first linkage including a first laterally disposed link, a first upright lever fixedly secured to said first laterally disposed link in depending upright position, said second linkage including a second laterally disposed link, a second upright lever fixedly secured to said second laterally disposed link in depending upright position, pivot connections of said first laterally disposed link and pivot connections of said second laterally disposed link to said base and to said weighing frame for movement of said frame relative to said base in response to the load of material on the conveyor belt, a stabilizing link between said first linkage and said second linkage, pivot connections of said stabilizing link to said first upright lever and to said second upright lever to constrain said first linkage and said second linkage to joint movement and for level movement of said weighing frame relative to said base, a load responsive device that is yieldable in direct proportion to the magnitude of said load, and said load responsive device being disposed between said weighing frame and said base for transmission of the force of said load to the load responsive device.

3. In a belt conveyor in which a belt is supported by idlers for travel of said belt on the idlers and to carry material on the belt, weighing apparatus to weigh material that is carried on said belt comprising, a base to support said weighing apparatus in the conveyor, a weighing frame, a plurality of idlers secured to said weighing frame at spaced positions in supporting engagement with said belt for travel of the belt on the idlers, a first linkage between said base and said weighing frame, a second linkage between said base and said weighing frame, said first linkage and said second linkage being disposed at spaced positions along said base and said weighing frame, means connecting said first linkage and said second linkage to said base and to said weighing frame for movement of said frame relative to said base in response to the load of material on the conveyor belt, a stabilizing link between said first linkage and said second linkage, means connecting said stabilizing link to said first linkage and to said second linkage to constrain said first linkage and said second linkage to joint movement and for level movement of said weighing frame relative to said base, a load responsive device that is yieldable in direct proportion to the magnitude of said load, said base including a beam for supporting said load responsive device, said weighing frame including an element that is disposed over said load responsive device, an upright post on said beam, counterweight means mounted on said upright post, said counterweight means being interposed between said load responsive device and said frame element in contacting engagement with said load responsive device and in bearing engagement with said frame element to balance at least in part the weight of the weighing frame and said idlers, and said weighing frame bearing on said counterweight means and on said load responsive device in opposition to said beam for transmission of the force of said load to the load responsive device.

4. In a belt conveyor in which a belt is supported by idlers for travel of said belt on the idlers and to carry material on the belt, weighing apparatus to weigh material that is carried on said belt comprising, an elongated base to support said weighing apparatus in the conveyor, an elongated weighing frame that is substantially coextensive with said base, a plurality of idlers secured to said weighing frame at spaced positions in supporting engagement with said belt for travel of the belt on the idlers, a first lateral link connected between said base and said weighing frame and a second lateral link connected between said base and said weighing frame for movement of said frame relative to said base in response to the load of material on the conveyor belt, said first link and said second link being disposed at spaced positions along the length of said base and said weighing frame, a first upright lever fixedly connected to said first lateral link, a second upright lever fixedly connected to said second lateral link, a stabilizing link connected between said first upright lever and said second upright lever for joint movement of said first lateral link and said second lateral link and for level movement of said weighing frame relative to said base, a load responsive device that is yieldable in direct proportion to the magnitude of said load, and said load responsive device being disposed between said weighing frame and said base for transmission of the force of said load to the load responsive device.

5. In a belt conveyor in which a belt is supported by idlers for travel of said belt on the idlers and to carry material, on the belt, weighing apparatus to weigh material that is carried on said belt comprising, a rectangular base to support said weighing apparatus in the conveyor, a rectangular weighing frame that is substantially coextensive with said base and is disposed within said base, a plurality of idlers secured to said weighing frame at spaced positions in supporting engagement with said belt for travel of the belt on the idlers, a first linkage between said base and said weighing frame, a second linkage between said base and said weighing frame, said first linkage and said second linkage being disposed at opposite ends of said base and said weighing frame, said first linkage comprising at least two lateral links disposed one at each side of said base and said weighing frame, said second linkage comprising at least two lateral links disposed one at each side of said base and said weighing frame, means connecting said lateral links of the first linkage to said base and to said weighing frame and means connecting said lateral links of the second linkage to said base and to said weighing frame for movement of said frame relative to said base in response to the load of material on the conveyor belt, a first cross-member fixedly secured to said lateral links of the first linkage, a second cross-member fixedly secured to said lateral links of the second linkage, a first upright lever fixedly secured to said first cross-member, a second upright lever fixedly secured to said second cross-member, a stabilizing link between said first upright lever and said second upright lever, means connecting said stabilizing link to said first upright lever and to said second upright lever for joint movement of said lateral links of the first linkage and said lateral links of the second linkage and for level movement of said weighing frame relative to said base, a load responsive device that is yieldable in direct proportion to the magnitude of said load, and said load responsive device being disposed between said weighing frame and said base for the transmission of the force of said load to the load responsive device.

6. In a belt conveyor and weighing apparatus as recited in claim 5, said lateral links of said first linkage being disposed between said base and said weighing frame, said lateral links of said second linkage being disposed between said base and said weighing frame, said connecting means of said lateral links to said base and to said weighing frame each comprising a flexural pivot secured to a lateral link and to said base and a flexural pivot secured to a lateral link and to said weighing frame, said connecting means of said stabilizing link to first upright lever and to said second upright lever comprising a flexural pivot secured to said stabilizing link and to said first upright lever and a flexural pivot secured to said stabilizing link and to said second upright lever.

References Cited
UNITED STATES PATENTS

| | | | |
|---|---|---|---|
| 1,014,604 | 1/1912 | Messiter | 198—39 X |
| 2,812,171 | 11/1957 | Charbonnier et al. | 177—16 |
| 3,133,605 | 5/1964 | Christmann | 177—16 |

FOREIGN PATENTS

| | | |
|---|---|---|
| 475,264 | 7/1951 | Canada. |

RICHARD B. WILKINSON, *Primary Examiner.*

GEORGE H. MILLER, JR., *Assistant Examiner.*